No. 722,645. PATENTED MAR. 10, 1903.
C. A. TRIPP & G. R. WADLEIGH.
LEVEL INDICATOR FOR LIQUIDS.
APPLICATION FILED OCT. 21, 1901.
NO MODEL.
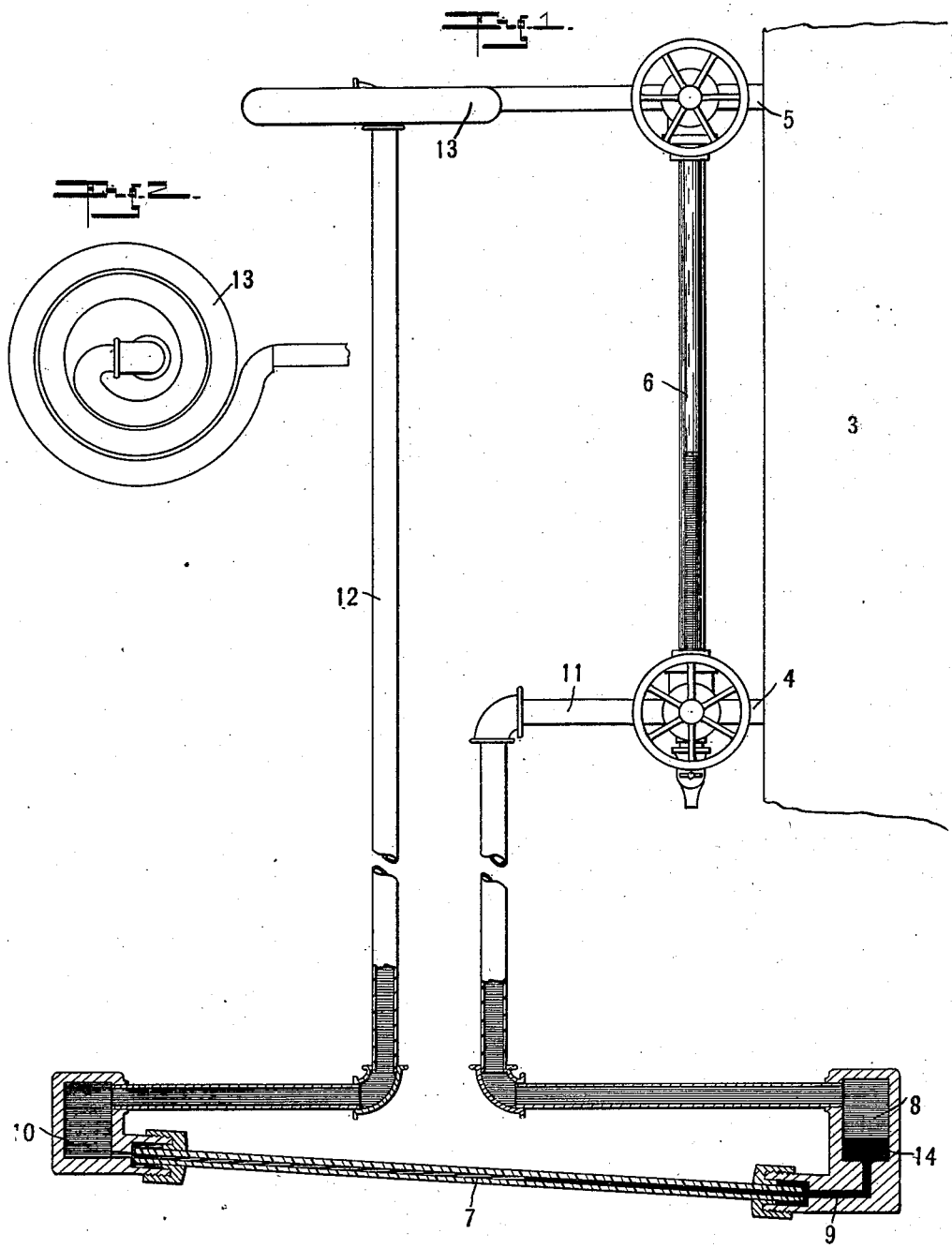
Witnesses
Frank A. Fahle
Bertha M. Ballard
Inventors
Charles A. Tripp.
George R. Wadleigh
By
Arthur M. Hood
Attorney

UNITED STATES PATENT OFFICE.

CHARLES A. TRIPP, OF INDIANAPOLIS, INDIANA, AND GEORGE R. WADLEIGH, OF JACKSON, TENNESSEE.

LEVEL-INDICATOR FOR LIQUIDS.

SPECIFICATION forming part of Letters Patent No. 722,645, dated March 10, 1903.

Application filed October 21, 1901. Serial No. 79,477. (No model.)

*To all whom it may concern:*

Be it known that we, CHARLES A. TRIPP, residing at Indianapolis, in the county of Marion and State of Indiana, and GEORGE R. WADLEIGH, residing at Jackson, in the county of Madison and State of Tennessee, citizens of the United States, have invented a new and useful Level-Indicator for Liquids, of which the following is a specification.

Our invention relates to means for indicating the level of a liquid in a reservoir or other vessel.

At the present time it is customary to indicate the level of liquid in a vessel by means of the usual "water-glass," located adjacent the vessel and generally near its upper end. In many types of vessels or reservoirs such an indicator is of but little value owing to the necessary distance from an observer; and the object of our present invention is therefore to provide a level-gage which may be located at any convenient point at any desired distance from the reservoir and yet of such character as to give an accurate indication of the level of the liquid in the reservoir between any desired maximum and minimum.

The accompanying drawings illustrate our invention.

Figure 1 is a side elevation, partly in section, of our apparatus. Fig. 2 is a plan of a portion thereof.

In the drawings, 3 indicates a reservoir from which is led at or below the point of desired minimum level a pipe 4. Leading from the reservoir at or above the point of desired maximum a point higher than the pipes 4 is a pipe 5, and between these two pipes may be mounted the usual water-glass 6, if desired.

Our invention consists in the provision of a gage-tube 7, which is preferably arranged upon a slight incline, as shown, in order that the reading may be inch for inch of the reading of the glass 6. The bore of the gage-glass 7 is preferably comparatively small. Connected to the lower end of the glass 7 is a reservoir 8, connecting with the bore of the glass 7 by a passage 9. The cross-section of the reservoir 8 is preferably considerably greater than the bore of the glass 7 in order that slight variations in level in the reservoir will cause greater variation in the gage-tube. Connected to the opposite end of the glass 7 is a reservoir 10. Leading into the upper end of reservoir 8 is a pipe 11 of a length sufficient to connect it with the pipe 4. Leading into reservoir 10 is a pipe 12, which connects with the pipe 5, preferably through a substantially horizontal coil or expansion-tank 13. We place in the reservoir 8 and glass 7, a liquid 14 of greater specific gravity than the liquid to be contained in the reservoir 3, mercury being probably the most convenient for most purposes, although water may be used when a lighter substance, such as gasolene, is to be contained in the reservoir 3. The pipes 11 and 12 are filled with the liquid to be contained in the reservoir 3. If the liquid in reservoir 3 does not reach pipe 5, the head of said liquid through the pipes 4 and 11 above the measuring fluid 14 in the reservoir 8 is less than the head of similar fluid in the pipes 12 and the reservoir 10, thus resulting in a lower level of measuring fluid in the glass 7. As the level in reservoir 3 rises the head in pipe 11 increases, thus serving to push the measuring fluid from the reservoir 8 up farther into the glass 7 and giving an indication of the level in reservoir 3. Owing to the smallness of the bore of the glass 7 the head of the liquid in the pipes 12 is approximately constant through the entire change of position of the measuring fluid in the glass 7, and this approximation is aided by reason of the horizontal coil 13. The body 7 may, it will be readily understood, be placed at any desired distance from the reservoir 3 and carried to any convenient point where it may be readily observed.

The expansion-tank or coil 13 need not necessarily be connected to the reservoir 3; but in the case of connection to a boiler or reservoir containing liquid under pressure the pipe 5 should lead from the coil 13 into the vapor-space of the boiler at a point no higher than the highest point of the coil. In this case the coil then serves as a condenser to condense sufficient vapor to maintain a constant head of liquid in the pipes 12 and so much of the coil as lies lower than the bottom of the pipe 5.

We claim as our invention—

1. A liquid-level indicator for boilers, consisting of a gage-tube, a measuring-fluid reservoir connecting with one end of said tube, a pipe adapted to connect said reservoir with the boiler, a second pipe connecting with the opposite end of the gage-tube and adapted to connect with the vapor-space of the boiler, and a horizontal condensing-coil arranged in said second pipe substantially on a level with the point of entrance to the vapor-space.

2. In an indicator for indicating the variations in level of a body of fluid at a point below the said level, a gage-tube intended to receive a registering fluid of greater specific gravity than the fluid to be indicated, means through which the body of fluid to be indicated may exert variations of pressure due to change of level upon one end of the column of registering fluid, and means for maintaining a constant pressure upon the opposite end of said column of said registering fluid, the tube being supported at such angle to the horizontal that the variation of the outer end of the column of registering fluid in the tube approximates the variations of level of the indicated fluid.

3. In an indicator for indicating the variations in level of a body of fluid at a point below the said level, a gage-tube intended to receive a registering fluid of greater specific gravity than the fluid to be indicated, a registering-fluid reservoir connected to the lower end of said tube, means through which said reservoir may be connected to the body of fluid to be indicated, and means by which a constant head of fluid may be maintained through the upper end of the gage-tube, the tube being supported at such angle to the horizontal that the variations of the outer end of the column of registering fluid in the tube will approximate the variations of level of the indicated fluid.

CHARLES A. TRIPP.
GEORGE R. WADLEIGH.

Witnesses to signature of Charles A. Tripp:
ARTHUR M. HOOD,
BERTHA M. BALLARD.

Witnesses to signature of George R. Wadleigh:
JAMES B. YOUNG,
FRED J. YOUNG.